United States Patent
Lee et al.

(10) Patent No.: US 10,301,824 B2
(45) Date of Patent: May 28, 2019

(54) LATTICE STIFFENER

(71) Applicant: Safran Landing Systems Canada Inc., Ajax (CA)

(72) Inventors: Randy Lee, Oshawa (CA); Owen Minnes, Toronto (CA)

(73) Assignee: Safran Landing Systems Canada Inc., Ajax (CA)

( * ) Notice: Subject to any disclaimer, the term of this patent is extended or adjusted under 35 U.S.C. 154(b) by 0 days.

(21) Appl. No.: 15/782,631

(22) Filed: Oct. 12, 2017

(65) Prior Publication Data

US 2019/0112811 A1 Apr. 18, 2019

(51) Int. Cl.
| | | |
|---|---|---|
| *E04C 3/08* | (2006.01) | |
| *B64C 25/32* | (2006.01) | |
| *B64C 25/14* | (2006.01) | |
| *E04C 3/02* | (2006.01) | |

(52) U.S. Cl.
CPC .............. *E04C 3/083* (2013.01); *B64C 25/14* (2013.01); *B64C 25/32* (2013.01); *E04C 2003/026* (2013.01)

(58) Field of Classification Search
CPC ... E04C 3/083; E04C 2003/026; B64C 25/14; B64C 25/32
USPC ........................................................ 52/656.2
See application file for complete search history.

(56) References Cited

U.S. PATENT DOCUMENTS

| 3,020,986 | A | | 2/1962 | Kirk et al. | |
|---|---|---|---|---|---|
| 3,070,198 | A | * | 12/1962 | Haskell | E04C 2/365 156/197 |
| 3,532,308 | A | * | 10/1970 | Renato | B64C 25/02 244/104 LS |
| 5,839,692 | A | | 11/1998 | Ralph et al. | |
| 9,120,566 | B2 | * | 9/2015 | O'Connell | B64C 25/50 |
| 2005/0217191 | A1 | * | 10/2005 | Davis | E04C 3/14 52/220.8 |
| 2009/0078821 | A1 | | 3/2009 | Chow et al. | |
| 2016/0152314 | A1 | | 6/2016 | Carlsten et al. | |

FOREIGN PATENT DOCUMENTS

| JP | 2015229390 A | 12/2015 |
|---|---|---|
| WO | 2009072317 A1 | 6/2009 |

OTHER PUBLICATIONS

Extended European Search Report dated Feb. 12, 2019, issued in corresponding EP Application No. 18200184.2, filed Oct. 12, 2018, 113 pages.

* cited by examiner

*Primary Examiner* — Patrick J Maestri
(74) *Attorney, Agent, or Firm* — Christensen O'Connor Johnson Kindness PLLC

(57) ABSTRACT

A fitting assembly includes a fitting with at least one a pocket. The pocket includes a web extending inward from a perimeter of the pocket, and the web has cutout that defines an inner edge. A stiffener is mounted within the pocket. The stiffener includes a lattice and a coupler that is configured to engage at least a portion of the web to mount the lattice to the fitting.

20 Claims, 5 Drawing Sheets

LATTICE STIFFENER

BACKGROUND

Large aircraft components, such as a main landing gear drag brace, are subjected to high operating loads, including compression, tension, and bending. These parts must be sufficiently strong and durable to withstand these loads without detrimental permanent deformation and the corresponding ultimate loads without failure. At the same time, aircraft operators demand aircraft with components that are (1) more economically manufactured, and (2) lighter, both of which decrease the aircraft operating costs.

Components are often designed to include large pockets that reduce the amount of material in non-critical areas. Webs that form the bottoms of these pockets stabilize the structure surrounding the pockets, i.e., the pocket walls, by reacting compression loads and bending moments as shear through the webs. While additional weight saving can be realized by utilizing cutouts in the webs, these cutouts reduce the capability of the structure to withstand operational loads.

Currently, the use of web cutouts is limited by structural requirements. Although weight can be minimized with internal cut-outs, care must be taken to remain within margins of safety. The buckling allowable, P'', defines the maximum axial load a column can withstand prior to buckling. When bending moments and eccentricities are present, these further reduce the structural capability of the design due to the buckling combined with a beam behavior. For an axially loaded column, Euler's critical load formula can be used to approximate $P_{cr}$:

$$P_{cr} = \frac{\pi^2 EI}{(KL)^2}$$

Where:

E is the modulus of elasticity for the column;

I is the second moment of area of the column's cross section;

L is the length of the unsupported section of the column; and

K is a factor which depends on the end conditions of the unsupported section (i.e. rotation/translation fixed/free).

Known solutions for increasing the buckling allowable of the part include (1) adding material to the beam column or change the geometry of its cross section to increase the second moment of area (increasing I) and/or (2) decreasing the length of the unsupported column section(s) (decreasing L). However, adding additional material increases the weight of the part significantly.

SUMMARY

In a first representative embodiment of a disclosed lattice stiffener, a fitting assembly includes a fitting with at least one pocket. The pocket includes a web extending inward from a perimeter of the pocket, and the web has cutout that defines an inner edge. A stiffener is mounted within the pocket. The stiffener includes a lattice and a coupler that is configured to engage at least a portion of the web to mount the lattice to the fitting.

In a second representative embodiment of a disclosed lattice stiffener, a stiffening insert is configured for stiffening a fitting that has a pocket and a web extending inward from a perimeter of the pocket. The stiffening insert includes a lattice and a coupler associated with the lattice. The coupler is configured to engage at least a portion of the web to secure the lattice to the fitting.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present disclosure may include references to directions, such as "forward," "rearward," "front," "rear," "upward," "downward," "top," "bottom," "right hand," "left hand," "lateral," "medial," "in," "out," "extended," etc. These references, and other similar references in the present disclosure, are only to assist in helping describe and to understand the particular embodiment and are not intended to limit the present disclosure to these directions or locations.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number.

Figure 1:
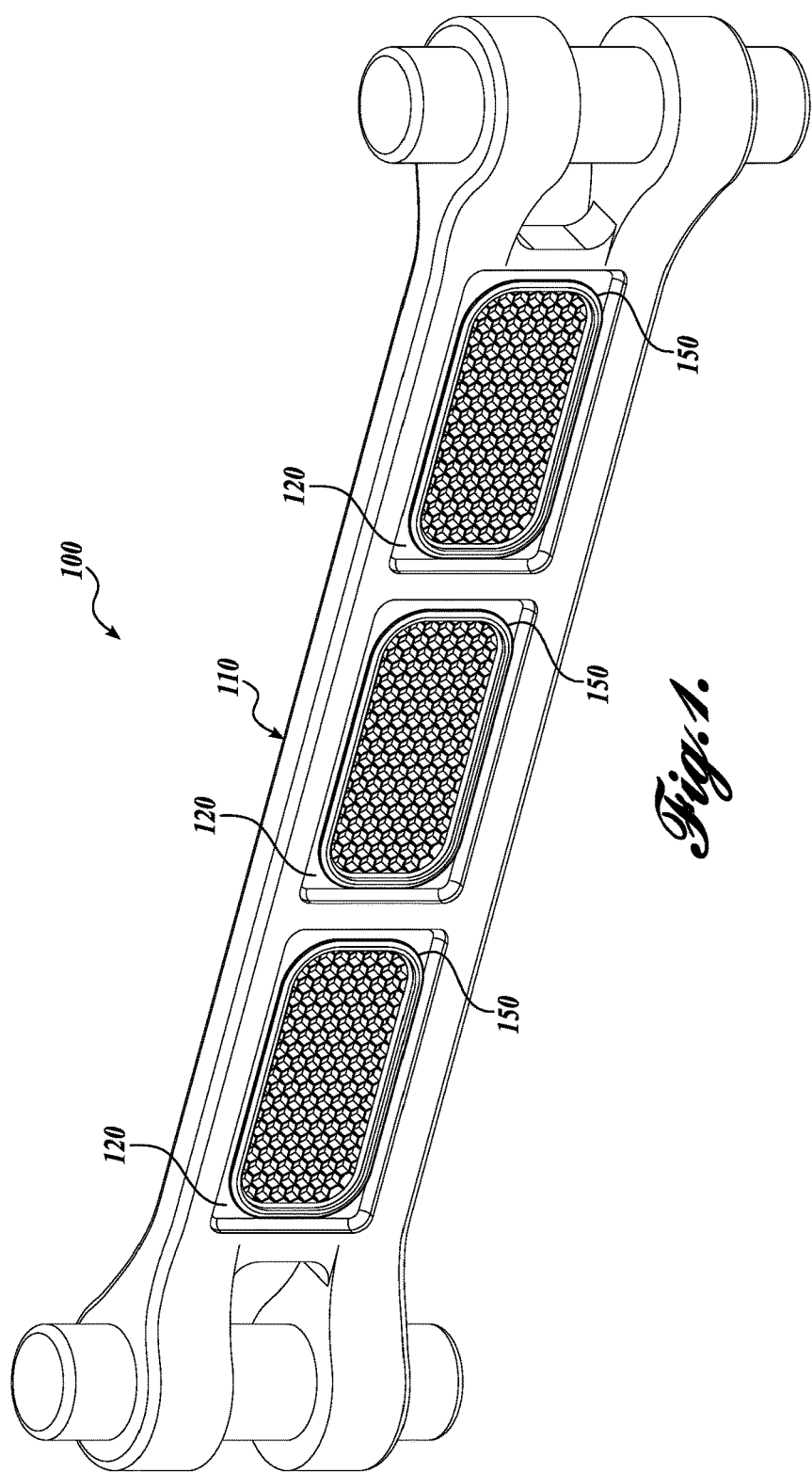
FIG. 1 shows an isometric view of a representative embodiment of fitting assembly having a plurality of stiffeners according to the present disclosure.
Figure 2:
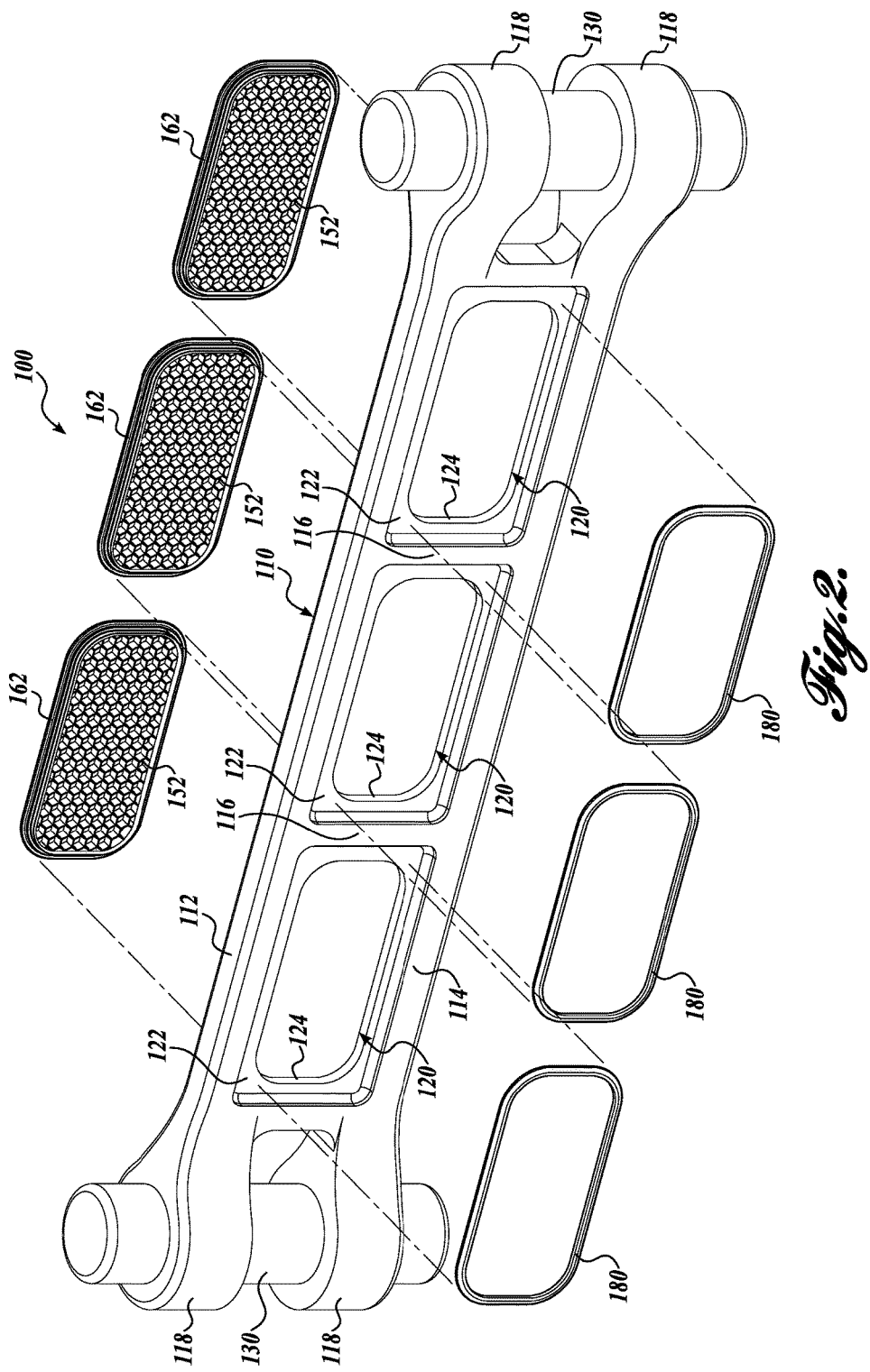
FIG. 2 shows a partially exploded isometric view of the fitting assembly shown in FIG. 1.

Referring now to FIGS. 1 and 2, a representative example of a fitting assembly 100 that includes a fitting 110 and a plurality of stiffening inserts 150 is shown. In the illustrated embodiment, the fitting 110 is an elongate steel fitting formed with lugs 118 disposed on each end so that the fitting can be attached to surrounding structure by pins 130. A plurality of pockets 120 is formed in the fitting 110 such that the pockets define portions of an upper rail 112, a lower rail 114, and stiffening beams 116 that extend from the upper rail to the lower rail.

The bottom of each pocket defines one side of a web 122. In the illustrated embodiment, second pocket 120 is formed on the opposite side of the fitting 110 such that the second pocket is symmetrical to, i.e., a mirror image of, the first pocket and defines a second side of the web 122. In this manner the web 122 is centrally positioned between the sides of the fitting; however, it will be appreciated that the position of the web, as well as the shape and depth of the pockets may vary within the scope of the present disclosure. Further, embodiments are contemplated in which corresponding pockets defining first and second surfaces of the web are not symmetrical but instead have different shapes and/or depths.

A cutout 124 is formed in each web 122 such that the web extends only part way across the bottom of the pocket. In this regard, the web 122 acts as a flange extending inwardly from the walls of the pocket 120, wherein the contour of the cutout 124 defines the end of the flange.

The disclosed fitting 110 is suitable for use as a drag brace for an aircraft landing gear assembly; however, it will be appreciated that the disclosed stiffening inserts 150 are not limited to use with such fittings or to fittings utilized for aircraft. In this regard, the fitting may be formed from any suitable material, including titanium, aluminum, or any other suitable metallic or non-metallic material. In addition, the fitting may by machining, forging, casting, 3-D printing, or any suitable manufacturing process or combination of processes. It will further be appreciated that the shape of the fitting, including the number, shape, and size of pockets and internal cutouts, the inclusion or absence of mounting lugs or other attachment features, and any other features of the fitting may vary. That is, the disclosed stiffening inserts 150 can be utilized with a variety of different types of fittings that are utilized in any number of different assemblies having a variety of functions. These and other alternative embodiments are contemplated and should be considered within the scope of the present disclosure.

Figure 3:
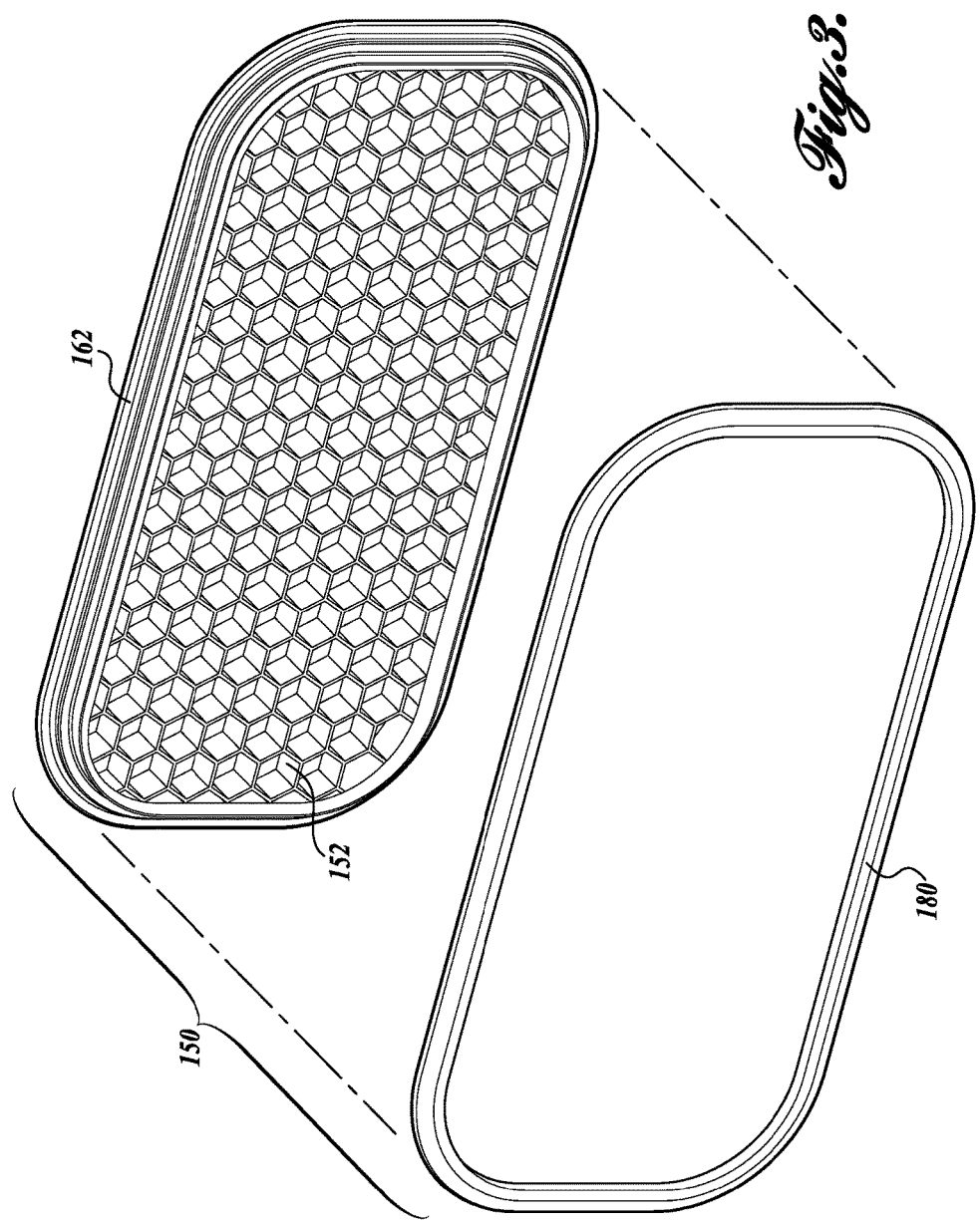
FIG. 3 shows an isometric view of a stiffener shown in FIG. 1.
Figure 4:
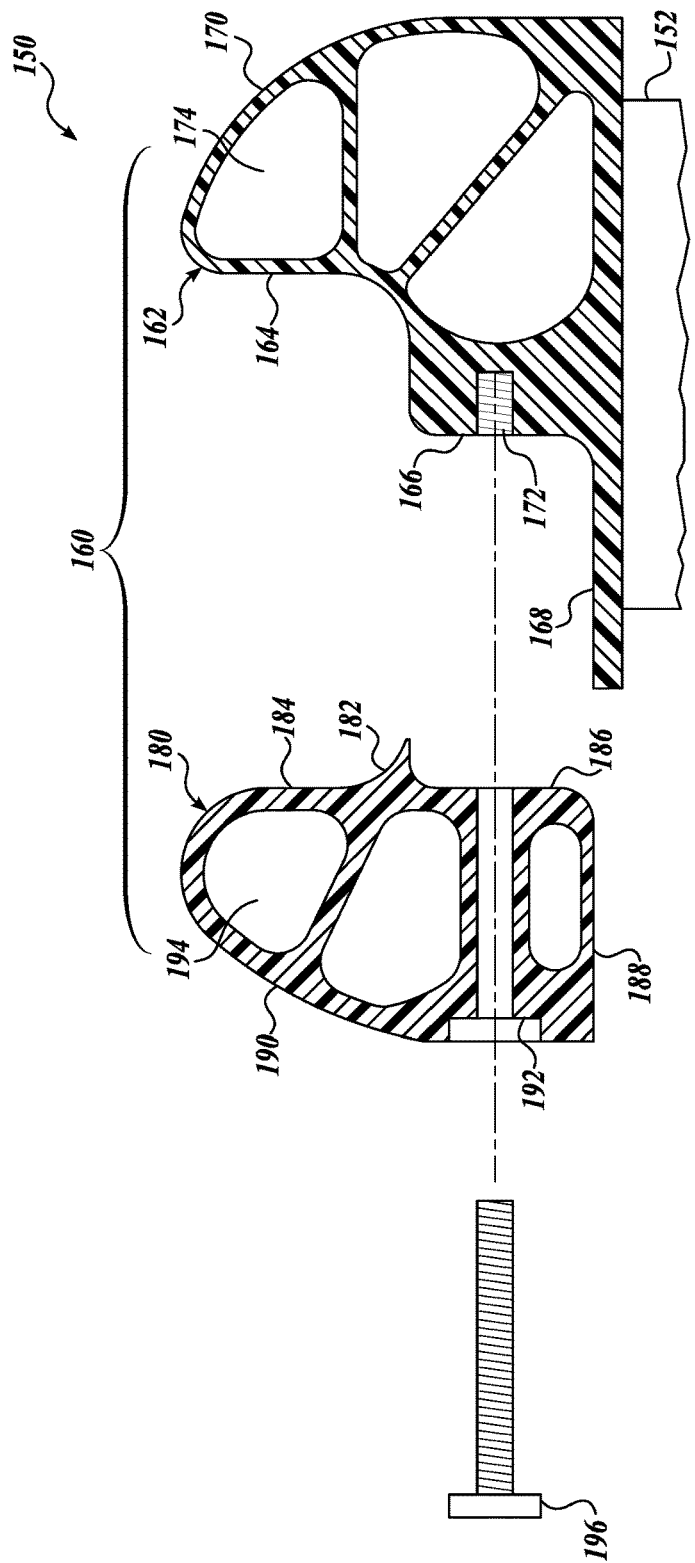
FIG. 4 shows a partial cross-sectional view of the stiffener shown in FIG. 3.

Referring now to FIGS. 3 and 4, the stiffening insert 150 includes a lattice 152 and a coupler 160 configured to couple the lattice to the fitting 110. In the illustrated embodiment, the lattice is a honeycomb structure, which is known to be lightweight and capable of withstanding high compressive via shear loads generated through the beam-column effect on the brace structure. In this regard, the honeycomb structure is capable of distributing a load by passing the load through the walls of the honeycomb. The honeycomb structure is configured to have a thickness, i.e., cell depth, that prevents the cell walls from buckling under experienced compressive loads. Further, the thickness of the honeycomb walls is configured so that stiffening insert 150 has the strength and stiffness required by the operating conditions of the fitting 110.

The disclosed lattice 152 if formed from a polymeric material, such as polyetherimide (PEI). PEI is particularly suitable because it has relatively high strength and stiffness properties and can be formed using additive manufacturing techniques. In this regard, the compressive strength of PEI generally ranges from 22 ksi to 32 ksi, and the compressive elastic modulus of PEI approximately 480 ksi. The use of additive manufacturing techniques reduces manufacturing costs, while allowing a for a complex honeycomb design. The stiffener can be printed quickly and without significant machine preparation, which offers flexibility in the design and allows the part to be produced on an as-needed basis.

While the disclosed lattice 152 is formed of PEI using additive manufacturing, the use of alternative configurations, materials, and manufacturing techniques is contemplated and should be considered within the scope of the present disclosure. In this regard, the lattice may be formed from other suitable materials, such as other suitable polymers, metals, and the like, or combinations thereof. Moreover, other manufacturing techniques suitable to the materials and configuration of the lattice 152 may be employed. In addition, the lattice 152 is not limited to a honeycomb having hexagonal cells, but can include cells of any number if shapes, such as round, triangular, square, octagonal, etc., or combinations thereof.

For embodiments in which the lattice 152 is formed from a polymeric material, Fused Deposition Modeling (FDM), which involves layering material to form a solid, can be used. FDM is considered to be a superior method for producing high strength plastic parts. The only significant drawback is the layered surface finish it produces, which in turn limits its strength in the z-direction. However, this is generally not be an issue with the disclosed lattice, as the loading tends to be purely longitudinal (x and y directions).

For embodiments in which the lattice 152 is formed from a metallic material, Electron Beam Additive Manufacturing (EBAM) can be used. For this method, metal wire or powder is heated using an electron beam and welded together to form a part. Although the higher density of the metallic material results in a weigh increase for comparable lattices, the metallic material also provides higher strength.

Still referring to FIGS. 3 and 4, the coupler 160 is configured to secure the lattice 152 to the web 122 of a pocket 120. The coupler 160 includes a first coupler portion 162 surround the perimeter of the lattice 150. In the illustrated embodiment, the lattice 150 has a generally rectangular exterior shape that corresponds to the counter of the cutout 124 in the web 122. The first coupler portion 162 extends around the exterior perimeter of the lattice 150 and is sized and configured to engage the web 122.

As best shown in the cross-sectional view of FIG. 4, the first coupler portion 162 includes an inner surface 164 secured to the lattice 152. In the illustrated embodiment, the first coupler portion 162 is integrally formed with the lattice 150; however, it will be appreciated that the first coupler portion 162 may be formed separately from and/or from a different material or the same material than the lattice. For embodiments in which the first coupler portion 162 is manufactured separate from the lattice 150, the first coupler portion is secured to the lattice using mechanical fasteners, adhesives, welding, mating geometry, or any other suitable method or combination of methods.

Still referring to FIG. 4, the first coupler portion 162 includes a retaining surface 164 sized and configured to engage one side of the web 122. The first coupler portion 162 also includes first and second engagement surfaces 166 and 168 sized and configured to engage corresponding surfaces 186 and 188 formed on a second coupler portion 180, described below. The body of the first coupler portion 162 preferably has a rounded outer surface 170 and a plurality of cavities 174 formed therein to decrease weight.

The second coupler portion 180 includes a retaining surface 184 that is generally parallel to and offset from the retaining surface 164 of the first coupler portion 162 when the stiffening insert 150 is installed on the fitting 110. The second coupler portion 180 also includes first and second interface surfaces 186 and 188 sized and configured to engage the first and second engagement surfaces 186 and 188, respectively, of the first coupler portion 162. Similar to the first coupler portion 162, the second coupler portion 180 preferably has a rounded outer surface 190 and a plurality of cavities 194 formed therein to decrease weight. A protrusion 182 extends from the second retaining surface 184 to provide a transition between the first and second coupler portions 162 and 180 when the stiffening insert 150 is coupled to the fitting 110.

The first coupler portion 162 is coupled to the second coupler portion 180 by a plurality of fasteners 196 positioned around the length of the coupler 160. In the illustrated embodiment, each fastener 196 extends through a counterbored hold 192 formed in the second coupler portion 180 and threadedly engages a corresponding threaded hole 172 formed in the first coupler portion 162. When the first and second coupler portions 162 and 180 are secured to each other, the first and second engagement surfaces 166 and 168 of the first coupler portion 162 engage the first and second engagement surfaces 186 and 188, respectively, of the second coupler portion 180 to position the first and second coupler portions relative to each other. Further, when the first and second coupler portions 162 and 180 are connected, the first and second retaining surfaces 164 and 184 engage opposite sides of the web 122, thereby securing the stiffening insert 150 to the fitting 110.

The two-piece coupler 160 of the disclosed embodiment is exemplary only and should not be considered limiting. In this regard, alternate embodiments are contemplated wherein the number, shape, configuration, etc. of the coupler components varies. Further, the present disclosure is not limited to the use of a particular number or type of fasteners to secure the lattice to the fitting. In this regard, the present disclosure contemplates the use of any number of mounting configurations that are suitable (1) to secure the lattice to the fitting and (2) transfer bending loads from the fitting into the lattice, and such alternate embodiments should be considered within the scope of the present disclosure.

Figure 5:
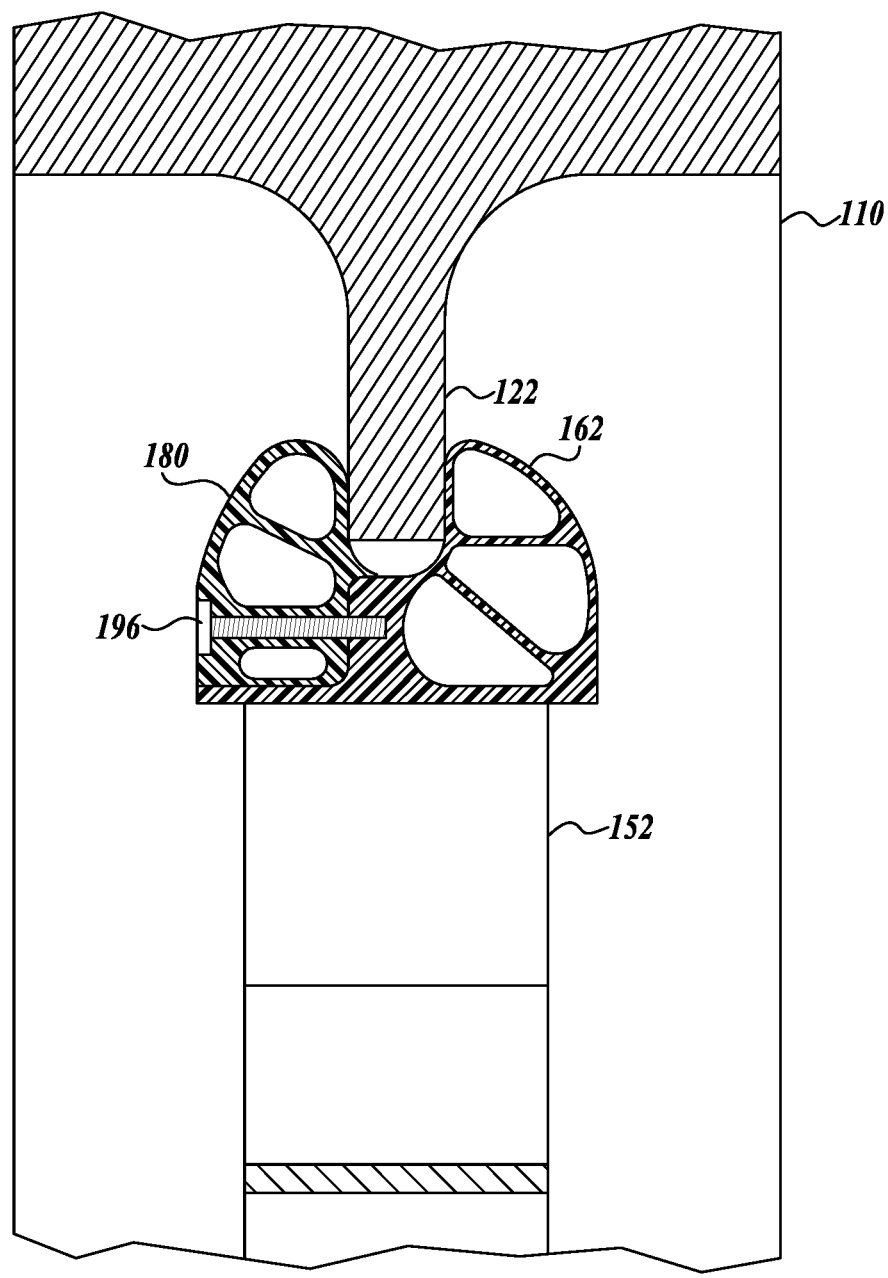
FIG. 5 shows a partial cross-sectional view of the fitting assembly shown in FIG. 1.

Referring now to FIGS. 4 and 5, to install the stiffening insert 150 in the fitting 110, the lattice 152 is positioned within the cutout 124 of the web 122 so that the retaining surface 164 of the first coupler portion 162 engages one side of the web. The second coupler portion 180 is positioned so that the first and second engagement surfaces 186 and 188 of the second coupler portion 180 engage the first and second engagement surfaces 166 and 168, respectively, of the first coupler portion 162. With the first and second coupler portions 162 and 180 so positioned, the retaining surface 184 of the second coupler portion 180 engages a second side of the web 122 so that the web is retained between the retaining surfaces 164 and 184. The first and second coupler portions 162 and 180 are secured to each other by a plurality of fasteners 196, thereby securing the stiffening insert 150 to the fitting.

The engagement of the stiffing insert 150 with the fitting 110 is sufficient for the stiffening insert to resist deformation of the fitting 110. To the extent that the fitting 110 does deform, the deformation increases the contact force at certain regions around the coupler 160. This force is then distributed through the lattice 152 and reacted by the fitting around the cutout 124 in the web 122.

While illustrative embodiments have been illustrated and described, it will be appreciated that various changes can be made therein without departing from the spirit and scope of the invention.

The embodiments of the invention in which an exclusive property or privilege is claimed are defined as follows:

1. An aircraft component, comprising:
   (a) an elongated steel fitting, comprising a plurality of pockets, wherein each pocket has walls surrounding the perimeter of the pocket and a web extending inward from the perimeter of the pocket, the web having an aperture defining an inner edge; and
   (b) a stiffener, comprising:
       (i) a lattice having a generally rectangular exterior shape having four straight edges that meet at a rounded corner, wherein the lattice is inserted in the aperture defined by the web; and
       (ii) a coupler configured to engage at least a portion of the web, the coupler coupling the lattice to the web,
   (c) wherein a majority of a length of the elongated steel fitting is comprised of the pockets having stiffeners with lattices.

2. The aircraft component of claim 1, the coupler comprising:
   (a) a first coupler portion secured to the lattice, the first coupler portion having a first retaining surface; and
   (b) a second coupler portion having a second retaining surface;
   wherein the first and second coupler surfaces engage the web to secure the stiffener to the web.

3. The aircraft component of claim 2, wherein the first coupler portion is releasably coupled to the second coupler portion.

4. The aircraft component of claim 2, wherein the first retaining surface engages a first side of the web, and the second retaining surface engages a second side of the web.

5. The aircraft component of claim 2, wherein the first coupler extends along the inner edge of the aperture.

6. The aircraft component of claim 2, further comprising a plurality of fasteners securing the first coupler portion to the second coupler portion.

7. The aircraft component of claim 2, wherein the first coupler portion is integrally formed with the lattice.

8. The aircraft component of claim 1, wherein the lattice comprises a plurality of hexagonal cells.

9. The aircraft component of claim 2, wherein the lattice comprises a polymeric material.

10. A stiffening insert configured for stiffening an elongated steel fitting having a pocket, wherein the pocket has walls surrounding a perimeter of the pocket and a web extending inward from the perimeter of the pocket, the stiffener, comprising:
    (a) a lattice having a generally rectangular exterior shape having four straight edges that meet at a rounded corner, wherein the lattice is inserted in an aperture defined by the web; and
    (a) a coupler associated with the lattice and configured to engage at least a portion of the web.

11. The stiffening insert of claim 10, wherein the coupler transfers bending loads from the fitting into the lattice.

12. The stiffening insert of claim 10, wherein the coupler comprises:
    (a) a first coupler portion associated with the lattice, the first coupler portion having a first retaining surface; and (b) a second coupler portion having a second retaining surface;

wherein the first and second coupler surfaces are configured to engage the web to secure the stiffener to the web.

13. The stiffening insert of claim 12, wherein the first coupler portion is integrally formed with the lattice.

14. The stiffening insert of claim 12, wherein the first coupler portion forms an endless loop surrounding a perimeter of the lattice.

15. The fitting assembly of claim 12, wherein the lattice comprises a polymeric material.

16. The fitting assembly of claim 11, wherein the lattice comprises a plurality of hexagonal cells.

17. A fitting assembly, comprising:
(a) a fitting having first and second surfaces on opposites sides of a thickness of the fitting, the fitting further comprising:
a first pocket on the first surface, the first pocket has walls surrounding an entire perimeter of the first pocket, and the first pocket has a depth extending partway through the fitting thickness,
a second pocket symmetrical to the first pocket, wherein the second pocket is on the second surface, the second pocket has walls surrounding an entire perimeter of the second pocket, and the second pocket has a depth extending partway through the fitting thickness, and
a web extending inward from the surrounding perimeter walls of bottoms of the first and second pockets, wherein the web has a thickness less than the fitting thickness, the web having an aperture defining an inner edge; and
(b) a stiffener, comprising:
(i) a lattice; and
(ii) a coupler configured to engage at least a portion of the web, the coupler coupling the lattice to the web.

18. The aircraft component of claim 1, further comprising an upper and lower rail on opposite sides of each of the pockets, and beams extending from the upper rail to the lower rail, wherein one beam separates adjacent pockets.

19. Aircraft landing gear comprising the aircraft component of claim 1.

20. Aircraft landing gear comprising the fitting assembly of claim 17.

* * * * *

UNITED STATES PATENT AND TRADEMARK OFFICE
CERTIFICATE OF CORRECTION

PATENT NO. : 10,301,824 B2  
APPLICATION NO. : 15/782631  
DATED : May 28, 2019  
INVENTOR(S) : R. Lee et al.

Page 1 of 1

It is certified that error appears in the above-identified patent and that said Letters Patent is hereby corrected as shown below:

On the Title Page

| Item (57) Column 2 | Abstract Lines 1-2 | "one a pocket" should read --one pocket-- |
| Item (57) Column 2 | Abstract Line 3 | "has cutout" should read --has a cutout-- |

In the Claims

| Column 6 (Claim 10, Line 10) | Line 60 | "(a) a coupler" should read --(b) a coupler-- |
| Column 7 (Claim 17, Lines 2-3) | Line 17 | "opposites sides" should read --opposite sides-- |

Signed and Sealed this  
Twenty-eighth Day of January, 2020

Andrei Iancu  
*Director of the United States Patent and Trademark Office*